(12) United States Patent
Barthel et al.

(10) Patent No.: US 9,744,914 B2
(45) Date of Patent: Aug. 29, 2017

(54) DEVICE FOR A VEHICLE HAVING A CAMERA UNIT LOCATED IN A PROTECTIVE HOUSING

(75) Inventors: Joachim Barthel, Essen (DE); Gerd Buschmann, Velbert (DE)

(73) Assignee: HUF HULSBECK & FURST GMBH & CO. KG, Velbert (DE)

( * ) Notice: Subject to any disclaimer, the term of this patent is extended or adjusted under 35 U.S.C. 154(b) by 340 days.

(21) Appl. No.: 13/439,028

(22) Filed: Apr. 4, 2012

(65) Prior Publication Data

US 2012/0257057 A1 Oct. 11, 2012

(30) Foreign Application Priority Data

Apr. 5, 2011 (DE) .................. 10 2011 001 825

(51) Int. Cl.
*B60R 11/04* (2006.01)
*B60R 19/48* (2006.01)
*B60R 11/00* (2006.01)

(52) U.S. Cl.
CPC ............ *B60R 11/04* (2013.01); *B60R 19/48* (2013.01); *B60R 2011/0094* (2013.01)

(58) Field of Classification Search
CPC . B60R 11/04; B60R 2011/0094; B60R 19/48; B60R 1/00; B60R 2300/105; B60R 2300/802; H04N 7/181
See application file for complete search history.

(56) References Cited

U.S. PATENT DOCUMENTS

| | | | | |
|---|---|---|---|---|
| 3,703,714 A | * | 11/1972 | Andrews ...................... 180/289 |
| 4,420,238 A | * | 12/1983 | Felix ............................. 396/427 |
| 5,638,672 A | * | 6/1997 | Furukawa ............... F16G 13/16 248/49 |
| 5,805,056 A | * | 9/1998 | Mueller et al. .......... 340/426.24 |
| 2003/0175027 A1 | * | 9/2003 | Komatsu ................. B60R 11/04 396/428 |
| 2009/0231430 A1 | * | 9/2009 | Buschmann et al. ......... 348/148 |
| 2009/0309971 A1 | * | 12/2009 | Schuetz .................. B60R 11/04 348/148 |
| 2010/0040361 A1 | | 2/2010 | Schuetz |
| 2012/0293656 A1 | * | 11/2012 | Schutz .................... B60R 11/04 348/148 |

(Continued)

FOREIGN PATENT DOCUMENTS

CN 101443213 A 5/2009
CN 101506456 A 8/2009

(Continued)

OTHER PUBLICATIONS

Chinese Office Action for corresponding application 201210098108.X; Date of Issuance Apr. 3, 2015.

*Primary Examiner* — Mohammed Jebari
(74) *Attorney, Agent, or Firm* — Cantor Colburn LLP (57) ABSTRACT

The invention relates to a device, particularly for a rear area of a vehicle, and a related method for operating the device, where the device includes a camera unit serving to record an image of the exterior area of the vehicle with the camera unit being protectively arranged via a support element at the vehicle, particularly protected in a housing, and a mobile closing element being provided for closing the housing opening, which by a drive unit can be moved into at least two end positions, namely a closed position and an open position.

2 Claims, 6 Drawing Sheets

(56) References Cited

U.S. PATENT DOCUMENTS

2012/0315027 A1* 12/2012 Schutz .................. B60R 11/04
396/419
2013/0294758 A1* 11/2013 Barthel .................. B60R 11/04
396/428

FOREIGN PATENT DOCUMENTS

| DE | 102006023103 A1 | 11/2007 |
|---|---|---|
| DE | 102006048371 A1 | 4/2008 |
| WO | 2010091657 A1 | 8/2010 |

* cited by examiner

DEVICE FOR A VEHICLE HAVING A CAMERA UNIT LOCATED IN A PROTECTIVE HOUSING

TECHNICAL FIELD

The invention relates to a device, particularly for the rear area of a vehicle, and a method for operating the device, where the device comprises a camera unit serving to record images of the exterior area of the vehicle. Here, the camera unit is arranged at the vehicle via a carrier element, particularly protected in a housing. Commonly such a device is provided in the rear hatch or in the area above or below the license plate or in the area of the bumper of the vehicle. In order for recording images via the camera unit to be possible and simultaneously for the camera unit to be provided protected inside the device, an articulate closing element is provided for closing the opening of the housing, which can be moved by a drive unit into at least two end positions, namely a closed position and an open position.

BRIEF DISCUSSION OF RELATED ART

From prior art, various devices are known serving to arrange a camera unit, particularly in the rear area of a vehicle, so that it allows recording images of the area behind the vehicle. The image obtained can then be displayed in the vehicle for the driver, in order to facilitate driving backwards. In order to prevent any soiling of the camera, it is arranged behind a closing element, which can be transferred from a closed position into an open position in order to allow image recording by the camera unit. Such a device comprising a camera unit is known from the publication DE 103 51 363 A1, for example. Further, various operating units are arranged in modern vehicles, in order to allow opening the rear hatch of a vehicle, for example. Frequently the device with the camera unit is provided separated from the operating unit for the rear hatch so that two different components must be assembled at the vehicle. From prior art it is also known to arrange the operating unit with the camera unit in a common device at the vehicle, in order to use as few separate components as possible. Here, generally the operating unit is mounted at the vehicle laterally next to, above, or below the camera unit. Consequently, such a combined device requires an appropriately large construction space.

BRIEF SUMMARY

Therefore the invention provides such a device with a camera unit, which comprises additional application options, such as an operating unit for the lock of the rear hatch of a vehicle, and in spite thereof showing a very compact design for the limited construction space available. Further, the objective of the present invention is also to provide a respective method for operating such a device, by which the potential applications of the device are increased.

Here, features and details disclosed in the context with the device according to the invention are also referenced in the context of the method according to the invention and vice versa, so that here always mutually reference is made to the disclosure of the individual aspects of the invention.

In the device according to the invention it may be provided that the closing element simultaneously serves to operate an electric switch in order to create a control signal inside the vehicle. Here, particularly in the closed position of the closing element, the electric switch may detect any force applied from the outside as a control signal, using measurement technology. Here, the term force applied from the outside is understood such that the force acts from outside the vehicle upon the device and not from the interior of the vehicle. Additionally, the force may represent a tension or a pressure. Here, it shall be clarified that the mechanical transfer of force from the closing element to the electric switch may occur not only directly but also indirectly. Consequently, additional elements may be provided between the closing element and the electric switch serving for the transfer of force. For example, a tappet may be arranged at the switch, which creates a relative motion of a component of the device by the force acting upon it and transfers it to the switch.

Furthermore, according to the invention it may be provided that the closing element simultaneously serves as an operating element for operating a lock of the rear hatch. Consequently the locking element represents a combined component, so that it simultaneously serves as an operating element. Beneficially, for this purpose the locking element comprises an area which can be deformed in order to allow transferring the force, impinging from the outside, to the electric switch with as little loss as possible. Here, the electric switch may be arranged directly behind the area which can be deformed at the inside of the locking element. Here, too it is also possible that a tappet is used between the closing element and the electric switch, in order to transfer the force acting from the outside upon the switch.

The electric switch may represent any arbitrary sensor element, which can create an analog or digital control signal. Further, the switch may be embodied as a pressure sensor, by which tensions can be detected as well. Here, e.g., Piezo-sensor elements may be used as pressure sensors. Further, the relative motion in the device caused by a force applied from the outside may also be detected by an optic sensor and converted into a control signal.

Furthermore, it is provided according to the invention that the opening of the housing serves at least for the camera unit to record images of the exterior area of a vehicle, in which particularly an inclined area is provided for the camera for recording images. Due to the fact that the image created by the camera unit shall be displayed on a monitor in the interior of the vehicle it is recommended for a reference point of the vehicle to be displayed on the image. This may represent, e.g. the bumper or the trailer hitch or the like. Additionally, it is mentioned that the present device according to the invention is not only suitable for the rear area of a vehicle, but the technology can also record images at a frontal area or a lateral area of the vehicle. For this purpose, the device according to the invention comprising a camera unit may be arranged in the sill board or in the bumper area of the vehicle. Of course, it is also possible that the device is arranged directly at the door sill or at a bumper. Furthermore, it may be provided that more than one device according to the invention is provided at the vehicle, perhaps in various embodiments, in order to allow displaying a bird's eye view of the vehicle with its adjacent areas on the monitor in the vehicle. Additionally the image recording area should also detect the normal horizon of the vehicle environment, allowing to create a comprehensive image detected by the camera unit.

Furthermore, according to the invention it may be provided that the camera unit is arranged in a mobile fashion at the carrier element on a sled, particularly inside the housing. Here, the sled may be supported at the carrier part via a linear guide. Preferably the linear guide at the housing is provided as a linear grove in the interior wall of the housing. At least one projecting guide cam is provided at the sled, which is guided in the guiding groove in a form-fitting fashion. The guiding cam may be embodied block-shaped with rounded edges. It is also possible that at least at one side of the sled two guiding cams are arranged in order to this way allow a guiding of the sled in the camera housing free from tensions. In order to assemble the guiding sled in the housing, said housing may be embodied in two parts, with a central separating seam being provided between the halves of the housing. Furthermore, it is possible according to the invention that the camera unit is supported via a tipping element on the sled. Consequently the camera unit may not be supported directly on the sled but indirectly via the tipping element. The tipping element itself may show a rotary axis fixed in reference to the sled, so that the tipping element comprises a point of rotation fixed in reference to the sled. The tipping motion of the tipping element may be achieved by a groove guide, embodied similar to the above-mentioned guide bar at the support element, particularly at the housing. This groove guide may also be embodied by a guiding groove, which is located laterally at the interior wall of the housing. In order to prevent the jamming of the tipping element when the camera unit is adjusted in the device, groove bars may be provided at the left and the right, which are arranged in the interior lateral walls of the housing via respective guide grooves. Additionally, it is possible according to the invention that the groove guide for the tipping element is arranged above the linear guide of the sled. Here, the groove guide may extend at least partially parallel in reference to the linear guide. Additionally, a spring element may be arranged between the tipping element and the sled in order to minimize the play of the camera unit in the device. Additionally, the spring may also serve to compensate tolerances in the groove guide and/or the linear guiding.

Within the scope of the invention it may be provided that the closing element for the camera unit is fastened at the sled. Here, the closing element may even be embodied in one piece with the sled, and be produced from an injection molded part. In this case, the number of components used for the device according to the invention further reduces. Additionally it is possible that the closing element is connected to the sled via a latching connection. The latching connection may represent a connection, which can be reversibly detached, so that the closing element can be separated from the sled without being destroyed, allowing the device according to the invention to be easily repaired or maintained. It is also possible that the latching connection between the closing element and the sled is embodied in an irreversibly detachable fashion (cannot be reversed), in order to largely exclude any manipulations of the device according to the invention from the outside. Latching connections are also possible between the closing element and the sled, which are embodied in a reversibly detachable fashion only when the closing element is in its open position, because here the latching connection can be detached with a tool.

In the present invention it may also be provided that the closing element is embodied at least partially with dual walls, with the electric switch detecting a relative motion between the two walls of the closing element by forces acting upon the closing element from the outside as a control signal using measurement technology. Here, the switch may be arranged between the two walls of the closing element in order to this way directly detect by way of measurement technology the force acting from the outside upon the wall of the dual-walled closing element. It is also possible that the entire switch is arranged behind the closing element and only a tappet between the closing element, particularly the exterior wall of the closing element, and the switch transfers the relative motion to the switch. The dual-walled closing element may still be embodied in one piece, in which here it is preferably embodied as an injection molded plastic part. It is even possible that the respective closing element comprises a uniform material and is made in one piece.

Furthermore, within the scope of the invention it may be provided that the closing element, which simultaneously serves as an operating element, is composed from two parts and shows an operating element and a base part. Here, the base part may close the opening of the housing in the closed position in a sealing fashion, while the operating part serves to operate the electric switch. The arrangement of the switch may be provided between the operating part and the base part. Additionally, similar to the dual-walled closing element, the switch may mechanically cooperate with the operating part via a tappet behind the closing element. The intermediate space between the operating part and the base part may be provided as a sealing space. Beneficially a water-tight membrane may be arranged between the operating part and the base part, by which the intermediate space is appropriately sealed.

It may further be provided in the invention that the drive unit is arranged at the outside of the housing, i.e. at the exterior wall of the housing of the camera unit. For this purpose, the drive unit may be connected via latching means to an exterior wall of a housing, with it also being necessary that the latching means compensate the torque created by the drive unit. For this purpose, additional support elements may be provided at the exterior housing wall, in order to mechanically support the latching means. Further, a single drive shaft may be guided from the drive unit into the housing in order to here ensure a drive of the camera unit. In this case, the rotary motion of the drive shaft is then converted into a longitudinal motion of the camera unit in the housing, particularly the sled of the camera unit. For this purpose, a coupling element may be arranged between the drive shaft and the sled. The coupling element itself then comprises a point of rotation fixed in reference to the drive shaft and serves as a one or two part pivot for the sled, by which the linear motion can be achieved, particularly with the above-mentioned linear guide.

Additionally it may be provided within the scope of the invention that the closing element is mechanically latched in the end positions, in order to prevent any unauthorized opening. This way, the theft protection for the camera can be considerably increased in a simple fashion, because removing the camera unit can only occur by destroying the device according to the invention. In this case, the closing element is beneficially connected irreversibly with the device, particularly the sled, in a mechanical fashion. Additionally it is possible that the above-mentioned coupling element is arranged between the drive shaft and the sled, in order to this way implement a mechanical latching of the closing element in the end positions. Here, the coupling element, particularly a first coupling part, can be moved in the end positions of the closing element beyond its respective dead centers. The dead center of the coupling element, particularly of the first coupling part, is given in the maximum displacement path of the sled.

After the coupling element, particularly the first coupling part, has been moved beyond its dead center, the sled is also moved back from its maximum displacement position. Due to the fact that the drive element is designed in a self-restricting fashion the drive shaft and the coupling element connected thereto in a torque-proof fashion cannot be further operated by the sled or the closing element. The dead centers of the coupling element, particularly the first coupling part, are located on a line intersecting the point of rotation of the coupling element and/or the drive shaft. The coupling element may also be embodied in two parts and comprise two coupling parts.

Within the scope of the invention it may also be provided that the camera unit and/or an electronic of the device are connected to an electronic line, which serves for the electronic connection to the vehicle electronic. Here, the line may be guided with a cable chain, at least inside the housing of the camera unit. The electric line can be guided here precisely inside the housing. The cable chain may be designed in a self-supporting fashion so that no additional support is required. Additionally, here an unauthorized manipulation or separation of the line can be prevented, because the cable chain provides sufficient protection. Beneficially the cable chain extends between an upper housing conduit of the line and the sled and/or tipping element for the camera unit. In the area of the housing opening for the line the cable chain may be connected to the housing in a fixed manner.

Furthermore, according to the invention it may be provided that in the closed position of the closing element the switch mechanically cooperates with the drive mechanic, particularly the sled, the tipping element, the coupling element, and/or the drive shaft for the camera unit. Consequently the switch cooperates not directly with the closing element but rather with the drive mechanic. Additionally, mechanic play may be provided between the closing element in the closed position and a seal at the housing opening, by which a minor relative motion can be created of the closing element in the closed position, however without compromising the sealing effect in this position. The present switch may also detect in the closed position both a tension as well as a pressure applied to the closing element using measurement technology. For example, a stop of the drive mechanic acting only in the open position may be used to detect the desired control signal by the optic or mechanic change. Of course, several switches may also be provided in the device according to the invention, in order to this way ensure a secure operation of the device and exclude faulty detection to the extent possible, by for example the control signals of the respective switches being compared with each other and a central control signal then being only forwarded to the vehicle electronic when identical control signals are given.

Furthermore, according to the invention it may be provided that the control signal of the electric switch serves to transfer the camera unit into the open position. The camera itself is then in its operating position, which may also represent a cleaning position. Additionally, a release signal may be given, so that only the closing element is transferred into the open position and thus the camera unit is set in the operating position when the control signal from the switch has been given and the release signal has been given. The release signal may be triggered by a vehicle-internal switch, for example, in order to this way allow to initiate a cleaning process of the camera unit.

In the method according to the invention a device may be realized, particularly for the rear area of a vehicle, comprising a camera unit serving to record images of the exterior area of the vehicle, with the camera unit being arranged via a support element at the vehicle, particularly protected in a housing, and a mobile closing element being provided for closing a housing opening, which can be moved by a drive unit into at least two end positions, namely a closed position and an open position. This device may also represent the above-described device according to the invention, particularly according to claim 1 and the respective dependent claims.

In the method according to the invention it may be provided that a control signal is created in the closed position of the closing element by an electric switch by a force acting from the outside upon the closing element. It is also possible that in the closed position the closing element cooperates with the electric switch in case of a force acting mechanically from the outside in order to create the control signal. It is also possible for a relative motion of the closing element or the drive mechanic for the camera unit to be detected by the electric switch in an optic, magnetic, or any other manner by way of measurement technology, in order to create the control signal.

As already mentioned, the method according to the invention may also be performed with the above-described device according to the invention. The device according to the invention can also be operated by the method according to the invention.

BRIEF DESCRIPTION OF THE DRAWINGS

Many advantages, features, and details of the invention are discernible from the following description, in which the invention is illustrated with reference to the drawings. Here, the features mentioned in the claims and the description for the device according to the invention and the method according to the invention may be essential for the invention individually or in any arbitrary combination. It shows:

DETAILED DESCRIPTION

FIGS. 1 through 8 show the device according to the invention in various embodiments, with the respectively same features being marked with identical reference characters. FIGS. 1 through 6 differ in the exemplary embodiments only by the different arrangement of the electric switch 15, which may be arranged at different locations inside the device 10 according to the invention, in order to illustrate the invention. Here, the electric switch 15 and/or the electric switches 15 each cooperate with the drive mechanic of the device 10 according to the invention.

Figure 7:
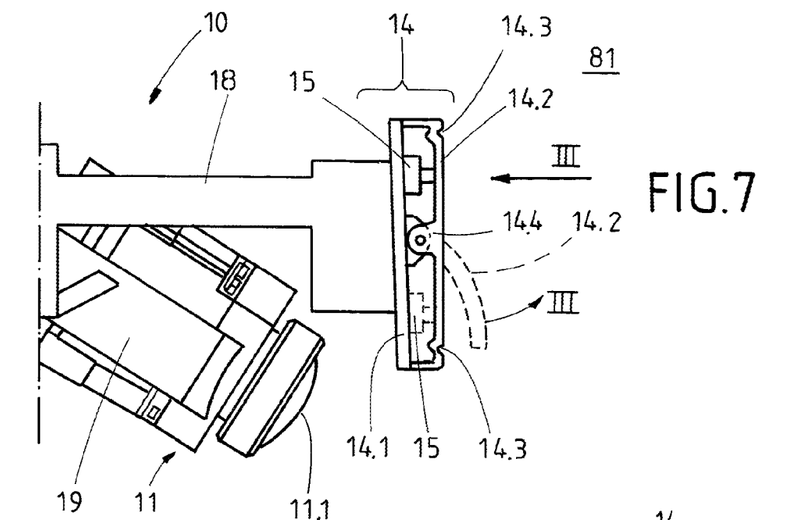
Figure 8:
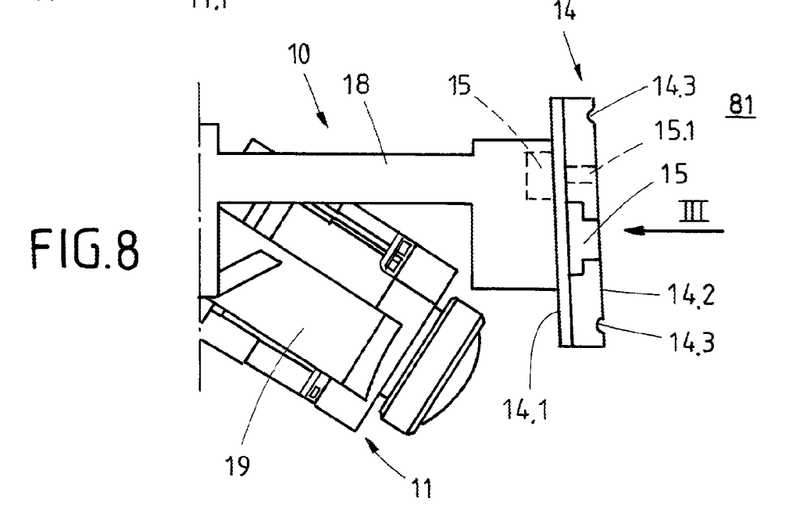

In FIGS. 7 and 8 the respective electric switch 15 cooperates with a two-part closing element 14, with in FIGS. 7 and 8 also different arrangements of the switch 15 are shown for illustrating the invention in an exemplary fashion.

Figure 1:
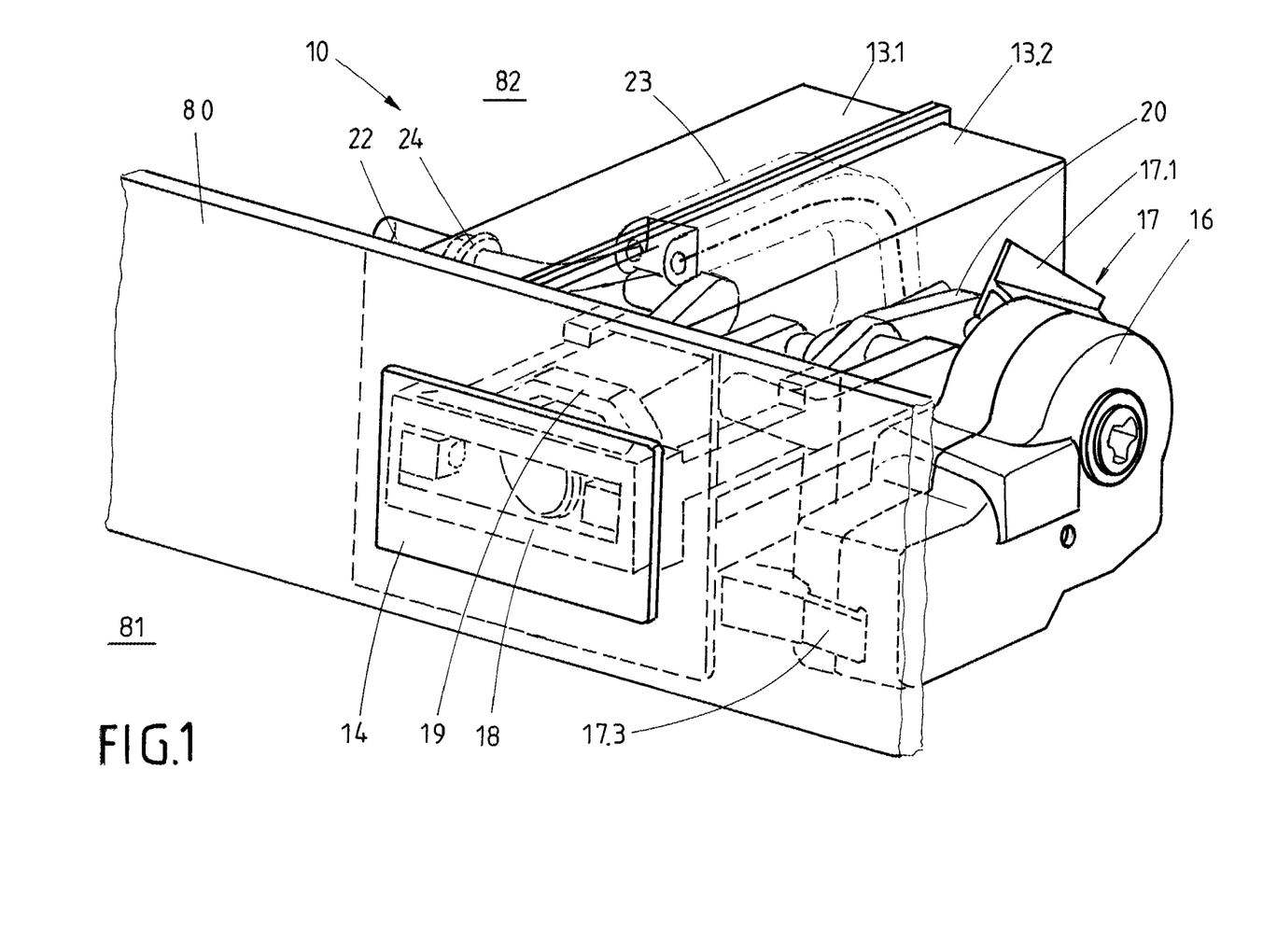
FIG. 1 a three-dimensional view of the device according to the invention in the closed position of the closing element, with large parts of the device being shown transparently, FIG. 2 a left side view of the device according to the invention of FIG. 1 comprising various examples for arranging the electric switch, FIG. 3 a left side view of the device of FIG. 2 in the open position of the closing element, FIG. 4 a three-dimensional view similar to FIG. 1 with the device of FIGS. 1 through 3 in the open position of the closing element, FIG. 5 an exploded illustration of a device according to the invention similar to FIGS. 1 through 4, FIG. 6 a three-dimensional view of the fastening of the closing element to the sled of the device according to the invention, FIG. 7 a partial side view of a device according to the invention with a closing element comprising an integrated switch, and FIG. 8 a partial side view of a device according to the invention, similar to FIG. 7, with another variant to arrange the switch at and/or in the closing element.

FIG. 1 shows a three-dimensional view of a device 10 according to the invention, which is arranged at a body part 80, particularly the bumper of a vehicle 80, in a fixed manner. Inside the device 10 a camera device 11 is arranged in an articulate fashion via a drive mechanism. The camera unit 11 itself is placed protected inside a housing 13, which can be fastened via a support element 12 to the device 10. In order to protect the camera unit 11 from dirt in its resting position, a closing element 14 is provided, which can close the opening 13.3 of the housing 13 in a closed position I. In order to allow the camera unit 11 to detect with its lens 11.1 an imaging area 11.2 of an exterior area of the vehicle 80 the closing element 14 is displaced into an open position II, thus releasing the opening 13.3 of the housing. Simultaneously the camera unit 11 is at least partially driven out of the device 10 by the drive mechanism (see direction of motion 11.3 of the camera unit in FIG. 2) in order to improve imaging. Here, the camera unit 11 moves to an exterior side 81 of the vehicle 80, while the housing 13 of the device 10 points towards the interior 82. The drive mechanism comprises a sled 18, a pivot 19, a two-part coupling element 20, as well as a drive shaft 21. Additionally, at the interior wall of the housing sides a linear guide 27 is provided for the sled 18 and a guide bar 28 for the pivot 19. The camera unit 11 sends its images via an electric line 22 to the electronic of the vehicle. In order to optimally protect the electric line 22 in the housing 13 a cable chain 23 is provided in which the electric line 22 is being guided. The cable line 22 exits the housing 13 at a penetration of said housing and is here sealed by a cable seal 24. The cable chain 23 begins at the interior housing cover near the cable seal 24 and ends shortly before the camera unit 11, with the cable chain 23 assuming a semi-circular progression. The cable chain 23 may also be fastened at the housing cover, in order to optimally guide the line 22 in the housing 13. Further the cable chain 23 may be embodied in a self-supporting fashion.

A drive unit 16 is provided attached by flanges at the outside of the housing 13 in order to move the camera unit 11 from its resting position into its operating position in which an image can be recorded. The respective drive unit 16 is held via latching means 17 at the exterior of the housing 13. The respective latching means are shown clearly visible in FIGS. 1, 4, and 5. Here, the latching means 17 project from the lateral housing in order to hold the drive unit 16 in a form and force-fitting fashion. The frontal latching means 17 are embodied as clips 17.3 and the rear latching means 17 show an arc-shaped reinforcement means 17.1, which is shaped like ribs. A penetration 17.2 is arranged in the reinforcement means 17.1, which cooperates with a projection at the housing of the drive unit 16 in a form-fitting manner. The assembly of the drive unit 16 may occur by a simple press motion onto the exterior of the housing.

A drive shaft 21 extends from the drive unit 16, which is guided through the two-part housing 13, particularly the second housing part 13.2. Inside the housing 13 the drive shaft 21 cooperates with the coupling element 20, with the drive shaft 21 being connected in a torque-proof fashion to the first part of the coupling element 20. The coupling element 20 comprises two pivots, which are connected to each other via a swivel joint. The second part of the coupling element 20 is connected via a cam to the sled 18 in a form-fitting fashion, with an accept 18.5 being provided in the sled 18 for this purpose.

Figure 2:
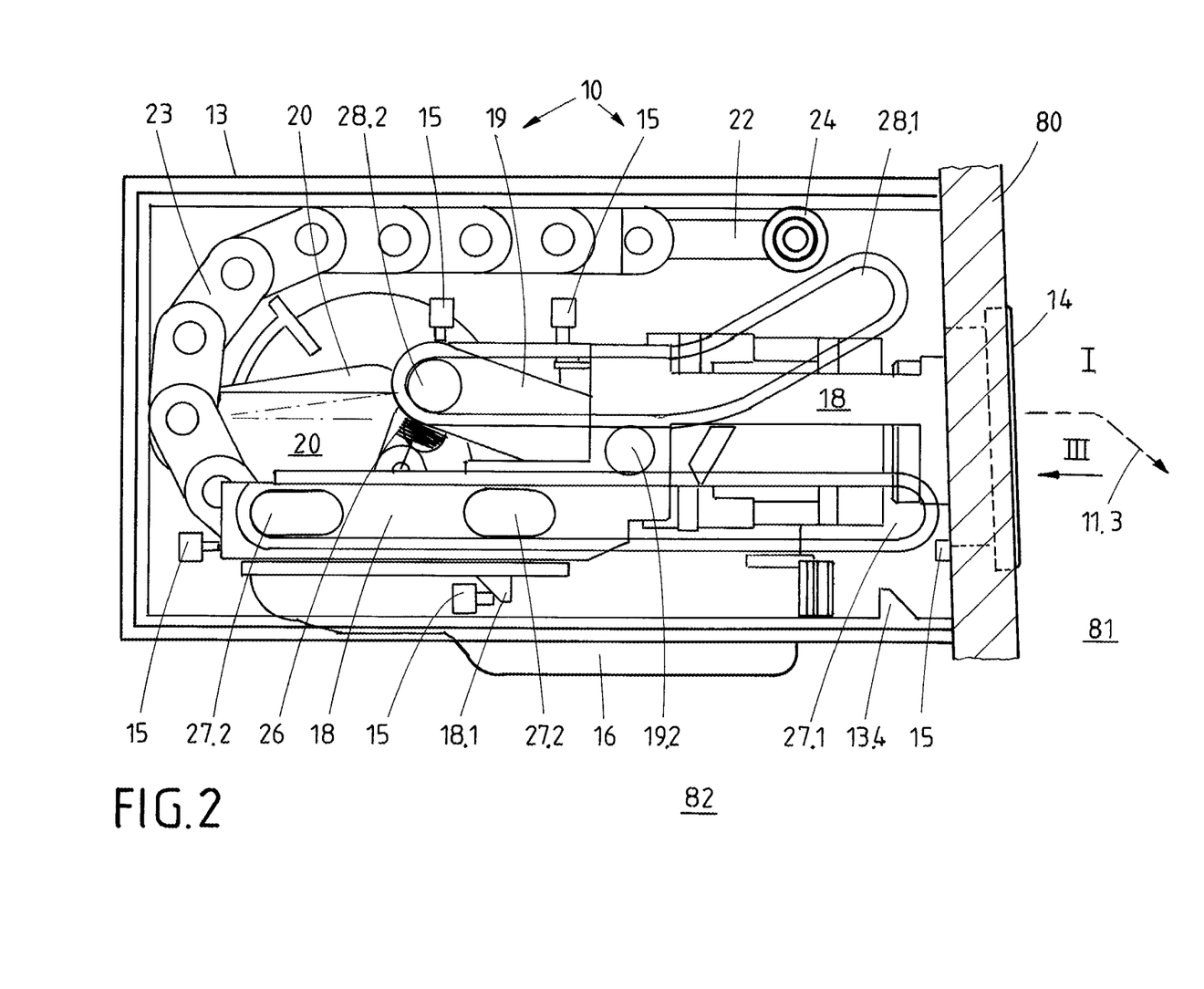
Figure 3:
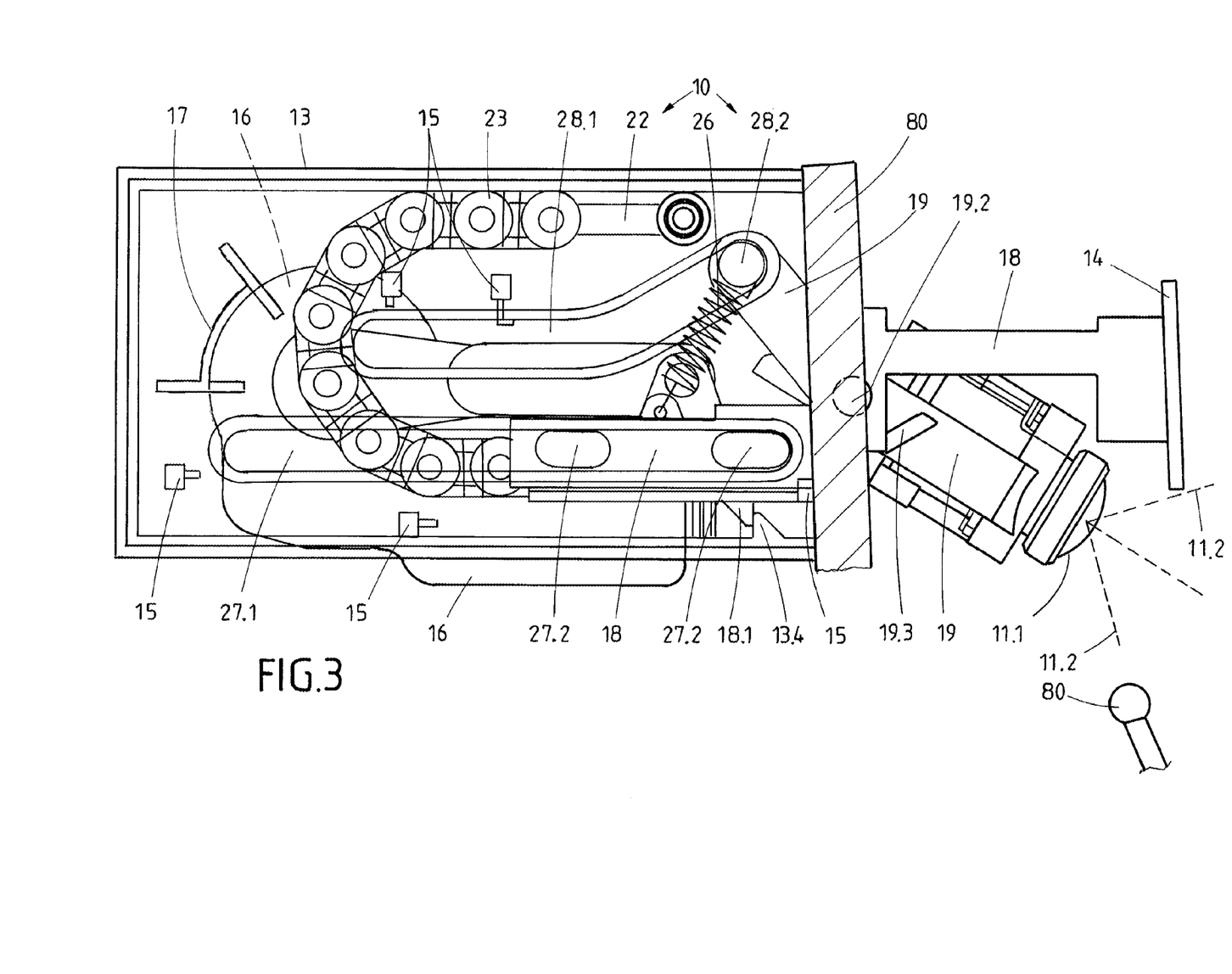

As clearly discernible from FIGS. 2 and 3 the sled 18 is supported via the linear guide 27 in the housing 13 in a longitudinally displaceable fashion. Here, the rotary motion of the drive shaft 21 introduced by the drive unit 16 is transferred via the coupling element 20 to the sled 18, which performs an exclusively longitudinal motion. The linear guide 27 is embodied at both sides in the housing parts 13.1 and 13.2 as a groove 27.1. Cams 27.2 are guided by the sled 18 in the groove 27.1. The cams 27.2 themselves are embodied block-shaped, with their edges being rounded.

The device 10 according to the invention is shown in a side view in FIGS. 2 and 3, with the housing 13 being shown transparently. The device 10 in FIGS. 2 and 3 differs only by the position of the camera unit 11 and/or the end positions I and II of the closing element 14.

FIG. 2 shows the closing element 14 in its closed position I. Here, the sled 18 is inserted into the housing 13 as far as possible, so that the rear cam 27.2 almost contacts the end of the groove 27.1, thus a stop can be formed. As clearly discernible from FIG. 2 the two lever parts of the coupling element 20 are located almost parallel in reference to each other, however the first coupling part being rotated beyond its dead center and thus showing a slight incline in reference to the second coupling part. The respective longitudinal axes are drawn in FIG. 2, with here it being discernible that an angle is formed between the two coupling parts 20.1 and 20.2. By the distortion of the first coupling part 1 beyond the first dead center a mechanical locking of the drive mechanic can be performed, particularly by the closing element 14.

In FIG. 3 the closing element 14 is shown in the open position II. Here, again the first coupling part 20.1 is distorted beyond its second dead center so that again the two longitudinal axes of the first and second coupling part 20.1 and 20.2 form a slight angle in reference to each other. The closing element 14 is hereby mechanically sealed in this open position II. A horizontal force impacting the closing element 14 leads to the first coupling part 20.1 being pressed further downward, with this rotary motion being prevented by a self-inhibiting drive unit 16.

In order for the camera unit 11 not being driven out of the housing 13 by the sled 18, additionally the pivot 19 is provided, which surrounds the camera at both sides. The camera unit 11 is arranged in the opening 19.1, in which the lens 11.1 projects from the opening 19.1. The pivot 19 has a point of rotation 19.2 fixed in reference to the sled 18, comprising at least one accepting bore 18.5 for said point of rotation 19.2. The pivot 19 is arranged at the left and the right side between the sled 18. The sled itself is also arranged at the left and right side in the housing 13, thus overall any canting or jamming of the drive mechanism being safely prevented. In order for the pivot 19 also performing a rotary motion in the sled 18, additionally a groove guide 28 is provided, which is inserted as a left and right lateral groove 28.1 in the lateral housing walls. Two bolt-shaped groove blocks 28.2 move in these grooves 28.1, provided at the pivot 19 at the left and the right side. Additionally a spring 26 acts upon the pivot 19 in order to allow optimal tolerance compensation. The spring 26 is arranged between the lever 18, particularly the hole 18.6, and the left groove block 28.2 of the pivot 19, by which the pivot 19 is pulled towards the sled 18.

As clearly discernible from FIGS. 2 and 3 the linear guide 27 and the groove guide 28 are arranged mostly parallel in reference to each other, with however the groove guide 28 being guided in the frontal house area upwards, i.e. towards the closing element 14, in order to this way realize the tipping motion of the camera unit 11.

FIGS. 2 and 3 shows optional positions for the electric switch 15. Here, a switch 15 in FIG. 2 cooperates with the rear end of the sled 18 in order to allow detecting via measurement technology a force III (see operating arrow) upon the closing element 14. As soon as this force III is applied, the sled 18 is slightly pressed into the housing 13, creating and/or triggering a control signal at the optional switch 15. For example, a first switch 15 is arranged at the rear end of the sled 18. Further, a second switch 15 cooperates with the stop 18.1 at the sled 18. It is also possible that a third switch 15 cooperates with the sled 18 in the area of the accept 18.5. A fourth switch 15 may further mechanically cooperate with the exterior end of the pivot 19 in the area of the groove block 28.2. A fifth optional switch is arranged in the frontal housing area 13 near the opening 13.3 of the housing and can directly cooperate with an interior side of the closing element 14. The closing element 14 shows a slight play in its closed position I, in which e.g., a sealing element is slightly impressed in the area of the opening 13.3 of the housing, cooperating with the closing element 14.

The above-mentioned switches 15 of FIG. 2 are respectively illustrated, for example, in FIG. 3, with here a contact to the drive mechanic not being given, though, because the closing element 14 is in its open position II. The above-mentioned optional switches 15 may be arranged at the left and right side in the housing 13. It is also possible that at least two optional switches 15 are simultaneously provided in the housing 13. However, it is sufficient for only one switch 15 being provided in order to this way allow converting a force III upon the closing element 14 into a control signal using measurement technology.

Figure 4:
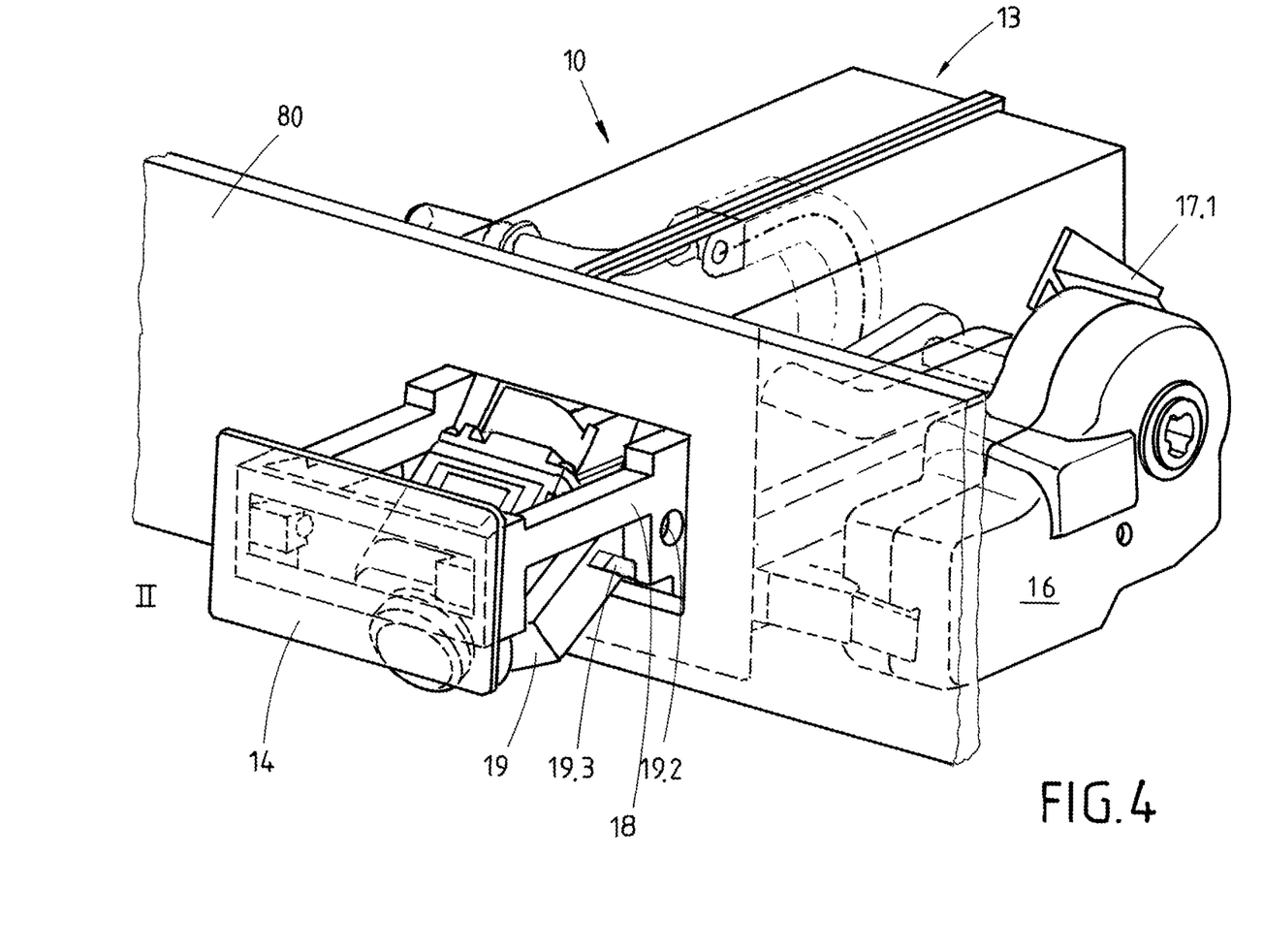

It is further discernible from FIG. 3 that the sled 18 with its lower stop 18.1 is moved against a stop 13.4 in the housing 13, thus the sled 18 cannot be moved any farther towards the opening 13.3 of the housing. Further, a stop 19.3 is provided at the pivot 19, which ensures that the pivot assumes a fixed position in reference to the sled 18 in both tipping positions. FIG. 4 clearly shows the cooperation of the stop 19.3 of the pivot 19 with the sled 18. FIG. 4 differs from FIG. 1 exclusively by the open position II of the closing element 14. FIGS. 1 and 2 show the device 10 according to the invention in the closed position I of the closing element 14. However in FIGS. 3 and 4 the closing element 14 is shown in the open position II. Here, the camera unit allows to record images, with the accepting area 11.2 being indicated. Additionally, a trailer hitch is shown as the body part 80 in FIG. 3, as an example.

Figure 5:
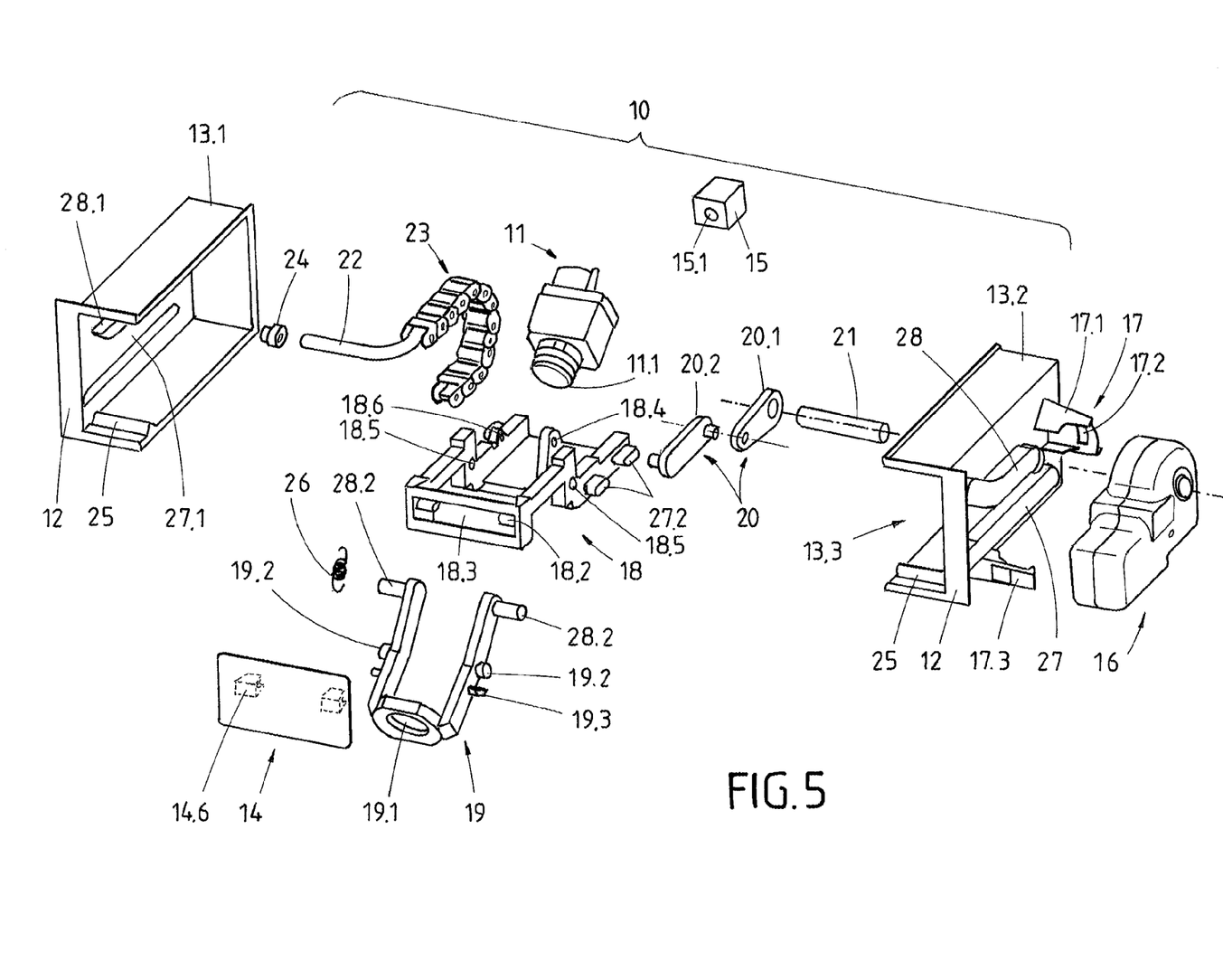

FIG. 5 shows an exploded illustration of the invention according to the invention of FIGS. 1 through 4, with only as an example a switch 15 has been drawn. It is clearly discernible from FIG. 5 that the housing 13 comprises a first housing part 13.1 and a second housing part 13.2.

Figure 6:
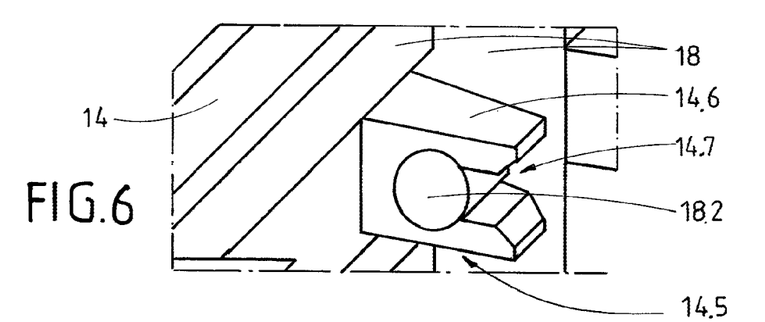

FIG. 6 shows the latched connection between the closing part 14 and the sled 18 in an enlarged illustration. Here, a support arm 14.6 projects from the rear and/or interior of the closing element 14 in the direction of the sled 18. This support arm shows an opening 14.7, which can accept a complementary embodied bearing pin 18.2 at the sled 18. The support arm 14.6 is provided at its end with a gap, which leads to the opening 14.7 so that the support pins 18.2 can also be latched to the sled 18 in the closing element 14. The gap in the support arm 14.6 comprises bevels, in order to allow easily inserting the support pin 18.2. The latched connection shown in FIG. 6 is embodied in a reversibly detachable fashion. Due to the width of the gap in the support arm 14.6 an irreversible latch connection may be embodied, too, which can only be loosened by way of destruction.

FIGS. 7 and 8 show how an optional switch 15 can directly cooperate with the closing element 14. For this purpose, the closing element 14 is shown in its open position II, however, with the electric element 15 serving to create a control signal in the closed position of the closing element 14.

In FIGS. 7 and 8 the closing element 14 is composed from two parts, with the base part 14.1 serving to seal the opening 13.3 of the housing and being connected to the sled 18. The operating part 14.2 is arranged in a slightly mobile fashion at the base part 14.1, e.g., via a membrane 14.3. A force III impinging the operating part 14.2 leads to a relative motion between the base part 14.1 and the operating part 14.2. The switch 15 arranged between the base part 14.1 and the operating part 14.2 can here easily detect via measuring technology this relative motion of the operating part 14.2 at the interior and convert it into a control signal. As further discernible from FIG. 8 an optional switch 15 is also shown in dot-dash lines, which is arranged at the sled 18 or an interior wall of the closing element 14, in order to detect the force III by way of measurement technology. For this purpose a tappet 15.1 projects from the switch 15, shown in dot-dash lines, through the closing element 14 and mechanically cooperates with the interior of the operating part 14.2. This way, the force III upon the operating part 14.2 can also easily be detected by the switch 15 using measurement technology. Optionally, the switch 15 shown in dot-dash lines may also be provided at the housing 13, however here actually measurement technology can only detect a force III upon the closing element 14, particularly the operating part 14.2, in the closed position I. In this case, the switch 15 of FIG. 8, shown in dot-dash lines, would be arranged similar to the fifth switch of FIGS. 2 and 3.

FIG. 7 also shows a two-part closing element 14, however with the operating part 14.2 being mechanically connected in an articulate fashion via the connection part 14.4 to the base part 14.1. The connection part 14.4 may be embodied as a rotary or tipping joint. Additionally, a membrane may be provided between the base part 14.1 and the operating part 14.2 for sealing purposes. Depending on the switch 15 being arranged above or below the connection part 14.4 (the switch 15 is shown only in dot-dash lines), a pressure or tension III (top pressure, bottom tension) may be detected by the respective switch 15. It is also possible that the operating part 14.2 comprises a hook-shaped projection (see dot-dash illustration), by which a tensile motion can easily be created by the user at the closing part 14.

Finally, it shall be mentioned that the closing element 14 of FIGS. 1 through 8 may therefore also serve as an operating element for operating the lock of a rear hatch or the like. Additionally, an opening of the device 10 may occur based on the detected force III upon the closing element 14 in the closed position I in order, e.g., to move the camera unit 11 into a cleaning position. For this purpose, additionally a release signal may be required, which can be created inside the vehicle by a release switch. Overall, the range of applications of the present device 10 can be considerably expanded, here, without increasing the construction space of the device 10 in the vehicle 80.

The invention claimed is:

1. A device for a vehicle, comprising:
   a camera unit disposed in a protective housing, the protective housing containing a cable chain disposed between an interior of the cover and the camera unit and configured to guide an electric line, wherein the cable chain is arranged about the electric line and includes a first end disposed at the uppermost area of the housing and a second end disposed at a sled;

a support element disposed on the housing and configured to secure the housing to the vehicle;

a mobile closing element comprising two walls and moveable between a closed position in which an opening of the housing is at least partially occluded by the mobile closing element and an open position in which the opening is at least partially open;

an electric switch disposed between the two walls of the closing element so as to be actuated by the mobile closing element, the switch configured to detect any force applied from outside of the vehicle as a control signal, wherein in the closed position, the switch detects both a tension and a pressure applied to the closing element using measurement technology;

a groove guide having a first portion which extends parallel to a longitudinal axis of the house and a second portion which extends upwardly at an angle to the longitudinal axis;

a pivot having a first end connected to the camera unit and a second end associated with and moveable within the groove guide;

a sled having a first end connected to the mobile closing element and a second end disposed moveably within the housing;

wherein the pivot is rotatably connected to the sled at a point of rotation;

wherein the camera unit is configured to rotate about the point of rotation into a downward tilting orientation when the mobile closing element is moved into the open position by way of the second end of the pivot traversing the second portion of the groove guide;

wherein the camera unit sends data via the electric line to the vehicle.

2. A device for a vehicle, comprising:

a camera unit disposed in a protective housing, the protective housing containing a cable chain disposed between an interior of the cover and the camera unit and configured to guide an electric line, wherein the cable chain is arranged about the electric line and includes a first end disposed at the uppermost area of the housing and a second end disposed at a sled;

a support element disposed on the housing and configured to secure the housing to the vehicle;

a mobile closing element comprising two walls and moveable between a closed position in which an opening of the housing is at least partially occluded by the mobile closing element and an open position in which the opening is at least partially open;

an electric switch disposed between the two walls of the closing element so as to be actuated by the mobile closing element, the switch configured to detect any force applied from outside of the vehicle as a control signal, wherein in the closed position, the closing element cooperates with the electric switch when a force acts mechanically from the outside to create a controlled signal;

a groove guide having a first portion which extends parallel to a longitudinal axis of the house and a second portion which extends upwardly at an angle to the longitudinal axis;

a pivot having a first end connected to the camera unit and a second end associated with and moveable within the groove guide;

a sled having a first end connected to the mobile closing element and a second end disposed moveably within the housing;

wherein the pivot is rotatably connected to the sled at a point of rotation;

wherein the camera unit is configured to rotate about the point of rotation into a downward tilting orientation when the mobile closing element is moved into the open position by way of the second end of the pivot traversing the second portion of the groove guide;

wherein the camera unit sends data via the electric line to the vehicle.

* * * * *